United States Patent [19]
Lindig et al.

[11] 4,001,741
[45] Jan. 4, 1977

[54] LOW WORKING TEMPERATURE REED GLASSES

[75] Inventors: Otto Lindig; Werner Sack, both of Mainz, Germany

[73] Assignee: Jenaer Glaswerk Schott & Gen., Mainz, Germany

[22] Filed: Jan. 28, 1976

[21] Appl. No.: 653,020

[30] Foreign Application Priority Data

Jan. 30, 1975  Germany .......................... 2503783

[52] U.S. Cl. .................................. 335/153; 106/52; 106/53; 106/54; 335/154
[51] Int. Cl.² ...................... C03C 3/08; C03C 3/10; E05C 7/06; H01H 1/66
[58] Field of Search ......................... 106/54, 53, 52; 335/151, 152, 153, 154

[56] References Cited

UNITED STATES PATENTS

| 3,672,919 | 6/1972 | Sack | 106/52 |
|---|---|---|---|
| 3,814,612 | 6/1974 | Inoue et al. | 106/52 |
| 3,876,437 | 4/1975 | Otsuka et al. | 106/53 X |
| 3,949,335 | 4/1976 | Morgan | 106/54 X |

FOREIGN PATENTS OR APPLICATIONS 2,004,234  4/1971  Germany

OTHER PUBLICATIONS

Western Electric–Technical Digest No. 2, Apr. 1966 (pp. 23–24) "Glass Envelope for Sealed Contacts, Containing Iron Oxide".
Report from Bell Laboratories – Electronic Industries, Jan. 1965 p. 70, "High-Speed Switch for Modern Telephone Systems", Chem. Abstracts 77, 24129q.

*Primary Examiner*—Helen M. McCarthy
*Attorney, Agent, or Firm*—Millen, Raptes & White

[57] ABSTRACT

A glass having a softening temperature ($E_W$) between 596° and 634° C. and a working temperature ($V_A$) between 792° and 863° C., said glass being produced from a melt having a composition expressed in percentages by weight as follows:

| | | | |
|---|---|---|---|
| $SiO_2$ | 50.9 | to | 60.4, |
| $B_2O_3$ | 1.5 | to | 11.5, |
| $Al_2O_3$ | 2.5 | to | 5.3, |
| $Li_2O$ | 0.75 | to | 3.0, |
| $Na_2O$ | 6.0 | to | 15.0, |
| $K_2O$ | 0 | to | 3.8, |
| $Li_2O + Na_2O$ | 8.0 | to | 17.3, |
| $Li_2O + Na_2O + K_2O$ | 11.0 | to | 19.7, |
| CaO | 0 | to | 1.5, |
| BaO | 0 | to | 12.9, |
| ZnO | 0 | to | 7.3, |
| PbO | 0 | to | 17.5, |
| BaO + PbO | 7.0 | to | 17.8, |
| $Fe_3O_4$ | 3.3 | to | 5.0, |
| $F_2$ | 0 | to | 0.7, |
| $Sb_2O_3$ | 0.05 | to | 0.1, |
| Sugar | 0.05 | to | 0.1. |

15 Claims, No Drawings

LOW WORKING TEMPERATURE REED GLASSES

BACKGROUND OF THE INVENTION

This invention relates to glass compositions and is concerned with the provision of improved glasses having softening temperatures ($E_W$) between 596 and 634° C. and working temperatures ($V_A$) between 792 and 863° C. The softening temperature ($E_W$) is that at which the viscosity of the glass is $10^{7.6}$ poise and the working temperature ($V_A$) is that at which the viscosity of the glass is $10^4$ poise. The transformation temperature (Tg) of the glass, i.e. the temperature at which the glass has a viscosity of $10^{13.5}$ poise, may be between 428 and 488° C. and the coefficient of thermal expansion ($\alpha$) of the glass between 20° and 300° C. is preferably between 80.1 and 110.2 × $10^{-7}$/° C.

The requirement for such glass compositions has arisen in the manufacture of electrical circuit components in which sensitive elements such as diodes are hermetically sealed within glass capsules or in which magnetically operated contact switches are fixed within glass containers and operate in a closed inert atmosphere. The manufacture of such components has led in the last decade to the development of special glasses, which are sometimes known as reed switch glasses because of their particular commercial application.

These glasses have been developed as a result of the requirement for bonding electrical conductors, such as contact switches, to glass in a defined and controllable atmosphere (of an inert or reducing gas) or in a vacuum without using the gaseous heating techniques which are normally employed for the hot-working of glass. The use of electric coil heating, and in particular beam heating with quartz-iodine lamps concentrated by means of gold reflectors, which has become important in recent years, has given rise to a group of infrared-absorbing glasses, the common characteristic of which is a blue-green colour as a result of the divalent iron content in the form of the FeO necessary to provide the IR-absorption.

A further general aim in the development of this group of glasses has been to keep the temperature necessary for hot working and glass-metal bonding as low as possible. Besides purely economic points of view, such as energy consumption, working life of the radiating system, and speed of the bonding process, vaporisation of constituents of the glass during the bonding process is also important. Condensates of easily evaporable oxides such as for example $B_2O_3$ and $K_2O$, can arise in the production area, and this is undesirable in view of the possible effect of such condensates on the operation and effective life of the controls. The evaporation of oxides such as these during the bonding and melting process depends on the glass composition, as well as on the melting temperature.

With these main points of view in mind a series of glasses containing FeO have been developed and put into use; these can be divided into three groups according to composition and physical behaviour, as shown in the following table:

|  | Group A Alkali-lead-silicates | Group B Alkali-silicate; lead-free | Group C Alkali-Silicate; lead-free poor evaporation |
|---|---|---|---|
| Density (g/cm³) | 3.05 – 3.15 | 2.52 – 2.56 | 2.51 – 2.65 |
| Tg | 430 – 440 | 440 – 460 | 470 – 490 |
| $E_W$ | 620 – 630 | 620 – 660 | 660 – 680 |
| $V_A$ | 970 – 980 | 960 – 980 | 950 – 1000 |

While group A glass was developed from a lead glass (PbO-content 26 – 30 weight -%) already internationally known and used for a long time by the introduction of FeO, Group B glass is a special development for this application. Here, the aim has been to produce a lead-free glass of which the temperatures Tg, $E_W$ and $V_A$ do not differ to any great extent from the glasses of Group A. With the decrease in the lead content, the effects of reduction during hot working of the glass can be avoided. Besides the decrease in the lead content, an attempt was made with glasses of Group C to reduce the content of readily vaporised oxides and consequently to avoid the formation of condensates in the switch room.

Apart from the differences described above between these three groups of glass, there are only small or technically hardly significant differences between the temperatures, which have to be utilized for hot working of the glasses in the production of electronic components. The temperature at which a viscosity of $10^4$ poise is obtained can be taken as the prime characteristic for this. From this it follows that the hitherto known reed glasses can be regarded as practically equivalent as regards the working temperature and in connection with this, the rate of production, as described in German Pat. Specification No. 2,116,155.

SUMMARY

An object of the present invention is to provide novel glasses and especially glasses having working temperatures that are between 100° and 200° C. below those of the glasses of Groups A, B and C referred to above.

Another object is to provide a novel glass to metal bonded structure.

A further object is to provide switches made from conductors and the novel glass of this invention.

Upon further study of the specification and appended claims, further objects and advantages of this invention will become apparent to those skilled in the art.

To attain these objects, there is provided a glass having a softening temperature ($E_W$) between 596° and 634° C. and a working temperature ($V_A$) between 792° and 863° C. from a melt having a composition expressed in percent by weight as follows:

|  | General | | | Preferred | | |
|---|---|---|---|---|---|---|
| $SiO_2$ | 50.9 | to | 60.4 | 56 | to | 60.4 |
| $B_2O_3$ | 1.5 | to | 11.5 | 1.5 | to | 7.0 |
| $Al_2O_3$ | 2.5 | to | 5.3 | 4.0 | to | 5.3 |
| $Li_2O$ | 0.75 | to | 3.0 | 1.7 | to | 2.5 |
| $Na_2O$ | 6.0 | to | 15.0 | 9.5 | to | 15.0 |
| $K_2O$ | 0 | to | 3.8 | 0 | to | 1.5 |
| $Li_2O + Na_2O$ | 8.0 | to | 17.3 | 11.2 | to | 17.3 |
| $Li_2O + Na_2O + K_2O$ | 11.0 | to | 19.7 | 12.0 | to | 19.0 |
| CaO | 0 | to | 1.5 | 0 | | |
| BaO | 0 | to | 12.9 | 4.5 | to | 12.9 |
| ZnO | 0 | to | 7.3 | 0 | | |

-continued

|  | General | | | Preferred | | |
|---|---|---|---|---|---|---|
| PbO | 0 | to | 17.5 | 0 | to | 12.0 |
| BaO + PbO | .0 | to | 17.8 | 11.3 | to | 16.8 |
| Fe$_3$O$_4$ | 3.3 | to | 5.0 | 3.5 | to | 4.0 |
| F$_2$ | 0 | to | 0.7 | 0 | | |
| Sb$_2$O$_3$ | 0.05 | to | 0.1 | 0.05 | to | 0.1 |
| Sugar | 0.05 | to | 0.1 | 0.05 | to | 0.1 |

The addition of sugar, which acts as a reducing agent, serves to ensure the required heat adsorption characteristics of the glass between 1.1 and 1.2$\mu$ by divalent iron oxide (FeO), i.e. for displacing the iron-II/III-balance, occurring as a result of the melting process, to the side of the divalent iron oxide. The sugar is decomposed without residue; the oxidized components such as CO$_2$ escape in gaseous form. Sb$_2$O$_3$ serves as a refining agent.

By virtue of the present invention, it is possible to reduce the degree of evaporation of certain components of the glass such as K$_2$O, PbO, B$_2$O$_3$ and F$_2$, to a minimum during reed switch production, allowing the necessary hot working of the glass to be carried out at lower temperatures and thus more quickly, and also making the production process more economical. In addition, it follows from the low working temperatures of the glasses in accordance with the present invention, that there is the possibility of using magnet alloys in reed switches, of which the magnetic properties vary considerably with and are dependent on previous temperature conditions. In known manufacturing processes, for example, the properties of such alloys have been altered with the hitherto necessary working temperatures to an undue extent and/or over an unduly large length of the metallic conductor element. This temperature sensitivity exists for example with the so-called "semihard" magnetic alloys, which in the last few years have been used increasingly for the production of so-called self-holding "residual switches." This temperature-dependent condition can be seen from the following article, incorporated herein: The Bell System Technical Journal 5 (1973) No. 8, Pages 1325 – 1340 M. R. PINELL and J. E. BENNETT. The figure in the article shows the change of the coercive force and residual magnetism depending on temperature and heating time for the making of the residual reeds for residual reed switches.

Further commercial alloys, which are suitable for the production of residual reed switches, are as follows iron (48.5%)/cobalt (48.5%)/vanadium (3%) and iron (29.2%)/cobalt (55.0%)/nickel (11.8%)/aluminum (1.0%)/titanium (3.0%).

With these alloys the magnetic properties necessary for residual reed switches are associated with a certain crystalline structure, which is obtained by annealing processes. A change in this crystalline structure (structural disintegration) occurs during the heating that occurs during bonding of the alloy to hot glass, the higher the temperature and the longer the alloy is subjected to that temperature the greater the degree of structural disintegration. Thus, the degree of change in magnetic properties increases more as the melting temperature of the glass increases. Another important consideration is the fact that, with an increased melting temperature, the length of the metal component that is heated necessarily increases, and the permanent magnetic flux of the alloy is adversely affected.

With the use of glasses which soften at low temperature, in accordance with the invention, changes can be avoided to a very great extent in the magnetic properties of the so-called "semihard" alloys during the production of electronic components using these glasses. Glasses in accordance with the invention make possible an extension of the range of properties of the alloys suitable for reed controls, and they are considerably superior to the hitherto known reed glasses.

Depending upon the thermal expansion coefficient of the magnetic alloy that is used, the thermal expansion coefficient of the respective glass according to the invention must be suited to that of the alloy used, in order to obtain a mechanically stable bond with a small amount of stress. In the temperature range of 20° to 300° C., the glass therefore has a thermal expansion coefficient ($\alpha$) of 80.1 to 110.2 $\times$ 10$^{-7}$/° C., a transformation temperature (Tg) of between 428 and 488° C., a softening temperature (E$_W$) of between 596 and 634° C., a working temperature (V$_A$) of between 792 and 863° C., a density (D) of 2.70 to 2.84 g/cc and a T$_{K\,100}$ value of between 210° and 250° C. According to DIN 12 111 the glass is within the 2nd Hydrolytic Class and does not change its crystal structure during automatic processing into tubes.

In a preferred embodiment of the invention, glass substantially free of PbO and F (i.e. not more than 1000 ppm) is produced having a composition as defined above and in which the percentages by weight of the following constituents of the melt are as follows:

| Na$_2$O | 8.0 | to | 15.0 |
|---|---|---|---|
| Li$_2$O + Na$_2$O | 11.0 | to | 14.1 |
| Li$_2$O + Na$_2$O + K$_2$O | 15.0 | to | 19.7 |
| BaO | 7.0 | to | 12.9 |
| ZnO | 0 | to | 6.5 |
| BaO + ZnO | 13.5 | to | 17.0 |

The above glass is advantageous because it contains no PbO and no fluorine which both would lead to decomposition products which could contaminate the atmosphere and could deposit on important parts of the switches.

The production of the reed and residual switches is conducted according to conventional procedures, but using lower temperatures to bond the glass to the metallic components. For further details of such switches and methods of making same, reference is directed to EIA/NARM Standard for Dry Reed Switches, December 1974, Electronic Industries Association.

The process parameters for the production of the glass of this invention are generally as described, for instance, in U.S. Pat. No. 3,672,919, and are conventional.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following table shows nineteen examples in percent by weight with the relevant properties of these nineteen glasses.

Sugar, $Sb_2O_3$ and $F_2$ (in the form of sodium fluorosilicate) are also introduced. The totals of the percent by weight of the examples are thus above 100%.

| Constituents | No. 1 | No. 2 | No. 3 | No. 4 | No. 5 | No. 6 | No. 7 | No. 8 | No. 9 | No. 10 |
|---|---|---|---|---|---|---|---|---|---|---|
| $SiO_2$ | 57.50 | 55.50 | 57.60 | 55.50 | 55.50 | 55.50 | 57.50 | 57.50 | 57.50 | 57.50 |
| $B_2O_3$ | 6.50 | 8.50 | 8.50 | 8.50 | 8.50 | 8.50 | 6.80 | 6.50 | 6.50 | 6.50 |
| $Al_2O_3$ | 3.50 | 3.50 | 4.40 | 3.50 | 3.50 | 3.50 | 3.70 | 3.50 | 3.50 | 3.50 |
| $Li_2O$ | 2.00 | 2.00 | 2.00 | 2.00 | 2.00 | 1.20 | 2.00 | 2.00 | 2.00 | 2.00 |
| $Na_2O$ | 9.00 | 6.00 | 9.20 | 9.00 | 9.00 | 9.80 | 9.20 | 9.00 | 9.00 | 9.00 |
| $K_2O$ |  | 3.00 |  |  |  |  |  |  |  | 0.70 |
| CaO |  | 1.50 |  |  |  | 1.50 |  |  |  |  |
| ZnO |  |  |  |  | 7.30 |  |  |  |  |  |
| BaO |  | 5.80 | 10.00 | 11.70 | 10.20 | 5.80 | 7.00 | 9.20 | 8.20 | 5.00 |
| PbO | 17.50 | 10.20 | 4.80 | 5.80 |  | 10.20 | 10.30 | 8.30 | 9.30 | 11.80 |
| $Fe_3O_4$ | 4.00 | 4.00 | 3.50 | 4.00 | 4.00 | 4.00 | 3.50 | 4.00 | 4.00 | 4.00 |
| $Sb_2O_3$ | 0.10 | 0.10 | 0.10 | 0.10 | 0.10 | 0.10 | 0.10 | 0.10 | 0.10 | 0.10 |
| $F_2$ |  | 0.70 | 0.50 | 0.70 | 0.70 | 0.70 |  | 0.70 |  |  |
| Sugar | 0.05 | 0.05 | 0.05 | 0.05 | 0.05 | 0.05 | 0.05 | 0.05 | 0.05 | 0.05 |
| Total | 100.15 | 100.85 | 100.65 | 100.85 | 100.85 | 100.85 | 100.15 | 100.85 | 100.15 | 100.15 |
| $\alpha \times 10^7$ | 80.1 | 80.8 | 81.5 | 81.8 | 81.9 | 82.3 | 82.4 | 84.4 | 83.4 | 84.0 |
| Tg | 428 | 446 | 474 | 446 | 465 | 462 | 471 | 452 | 468 | 458 |
| Ew | 596 | 613 | 628 | 615 | 621 | 622 | 633 | 614 | 623 | 617 |
| $V_A$ | 856 | 847 | 860 | 831 | 836 | 847 | 863 | 851 | 855 | 857 |
| Density | 2.84 | 2.83 | 2.76 | 2.74 | 2.78 | 2.83 | 2.81 | 2.84 | 2.84 | 2.83 |
| % Transmission for 0.5 mm thickness between 1.1 and 1.2 $\mu$ | | | | | 15 to 25 | | | | | |

| Constituents | No. 11 | No. 12 | No. 13 | No. 14 | No. 15 | No. 16 | No. 17 | No. 18 | No. 19 |
|---|---|---|---|---|---|---|---|---|---|
| $SiO_2$ | 56.50 | 56.00 | 58.00 | 50.90 | 50.90 | 58.00 | 58.50 | 57.70 | 60.40 |
| $B_2O_3$ | 7.20 | 8.00 | 6.70 | 11.50 | 11.50 | 6.70 | 5.50 | 3.50 | 1.50 |
| $Al_2O_3$ | 4.00 | 4.00 | 5.00 | 2.50 | 2.50 | 5.00 | 3.50 | 5.30 | 5.30 |
| $Li_2O$ | 2.00 | 3.00 | 2.00 | 0.75 | 2.50 | 3.00 | 2.00 | 1.50 | 2.30 |
| $Na_2O$ | 9.00 | 8.00 | 12.10 | 10.55 | 8.80 | 11.10 | 11.00 | 15.00 | 15.00 |
| $K_2O$ |  |  |  | 3.80 | 3.80 |  | 3.00 | 3.20 | 1.70 |
| CaO |  |  |  | 1.50 | 1.50 |  |  |  |  |
| ZnO |  | 4.80 |  | 6.50 | 6.50 |  |  |  |  |
| BaO | 5.00 | 12.20 | 5.80 | 7.00 | 7.00 | 12.90 | 12.70 | 10.00 | 10.00 |
| PbO | 12.80 |  | 7.10 |  |  |  |  |  |  |
| $Fe_3O_4$ | 3.50 | 4.00 | 3.30 | 5.00 | 5.00 | 3.30 | 3.80 | 3.80 | 3.80 |
| $Sb_2O_3$ | 0.10 | 0.10 | 0.10 | 0.10 | 0.10 | 0.10 | 0.10 | 0.10 | 0.05 |
| $F_2$ |  |  |  |  |  |  |  |  |  |
| Sugar | 0.05 | 0.05 | 0.05 | 0.05 | 0.05 | 0.05 | 0.05 | 0.05 | 0.05 |
| Total | 100.15 | 100.15 | 100.15 | 100.15 | 100.15 | 100.15 | 100.15 | 100.15 | 100.10 |
| $\alpha \times 10^7$ | 82.4 | 83.5 | 90.2 | 91.0 | 92.7 | 93.8 | 97.6 | 110.2 | 110.5 |
| Tg | 465 | 482 | 467 | 488 | 458 | 476 | 446 | 451 | 430 |
| Ew | 620 | 621 | 618 | 634 | 603 | 612 | 614 | 598 | 585 |
| $V_A$ | 860 | 827 | 856 | 835 | 792 | 818 | 847 | 837 | 845 |
| Density | 2.82 | 2.79 | 2.76 | 2.75 | 2.75 | 2.84 | 2.74 | 2.70 | 2.69 |
| % Transmission for 0.5 mm thickness between 1.1 and 1.2 $\mu$ | | | | | 15 to 25 | | | | |

The invention will now be described in more detail with reference to the following examples:

EXAMPLE A

For the production of 300 kg. of glass having a composition according to Example No. 11 the following mixture of raw materials is prepared:

166.6 kg. quartz sand, 18.1 kg. pure clay dehydrate, 38.2 kg. boric acid, 46.4 kg. soda, 19.3 kg. barium carbonate, 41.9 kg. lead silicate, 15.0 kg. lithium carbonate, 10.5 kg. black iron oxide, 0.30 kg. antimony oxide, and 0.15 kg. sugar.

The batch is melted in between 12 and 14 equally sized charges at 1420° C. in a basic glass smelting flask having a volume of 120 litres, then refined for 10 to 12 hours at 1400° C., cooled in about 6 to 8 hours to a working temperature of between 950° and 1050° C. and after approximately three hours at this temperature is worked into tubes or rods for purposes of re-drawing, for example by hand. The cooling of thick-walled articles takes place in between 1 and 2 hours at 500° C. with subsequent cooling at a speed of about 60° to 80° C./ hour down to 200° C. After this further cooling can take place as quickly as required.

EXAMPLE B

For the production of 300kg. of glass having a composition according to Example 13 the following mixture of raw materials is prepared:

172.7 kg. quartz sand, 22.6 kg. pure clay dehydrate, 35.6 kg. boric acid, 62.4 kg. soda, 22.3 kg. barium carbonate, 23 kg. lead silicate, 15.0 kg. lithium carbonate, 9.9 kg. black iron oxide, 0.30 kg. antimony oxide, and 0.15 kg. sugar.

Melting and working is effected as described in Example A.

EXAMPLE C

For the production of 300kg. of glass having a composition according to Example 18 the following mixture of raw materials is prepared:

117.5 kg. quartz sand, 84.1 kg. potassium feldspar, 21.7 kg. rasorite, 68.6kg. soda, 1.1 kg. potash, 11.3 kg. lithium carbonate, 38.5 kg. barium carbonate, 11.4 kg.

black iron oxide, 0.30 kg. antimony oxide, and 0.15 kg. sugar.

Melting and working is effected as described in Example A.

In view of the low working temperatures of the glasses described above they are admirably suited to use in the production of electronic components, such as reed switches, in which the glass is bonded to a metallic component whose magnetic or other properties are adversely affected by elevated temperature conditions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A glass having a thermal expansion coefficient ($\alpha$) of 80.1 to 110.2 × $10^{-7}$/° C. (20° –300° C), a transformation temperature (Tg) of between 428 and 488° C., a density (D) of 2.70 to 2.84 g/cc, a softening temperature ($E_W$) between 596° and 634° C. and a working temperature ($V_A$) between 792° and 863° C., said glass being produced from a melt having a composition expressed in percentages by weight as follows:

| | | | |
|---|---|---|---|
| $SiO_2$ | 50.9 | to | 60.4, |
| $B_2O_3$ | 1.5 | to | 11.5, |
| $Al_2O_3$ | 2.5 | to | 5.3, |
| $Li_2O$ | 0.75 | to | 3.0, |
| $Na_2O$ | 6.0 | to | 15.0, |
| $K_2O$ | 0 | to | 3.8, |
| $Li_2O + Na_2O$ | 8.0 | to | 17.3, |
| $Li_2O + Na_2O + K_2O$ | 11.0 | to | 19.7, |
| CaO | 0 | to | 1.5, |
| BaO | 0 | to | 12.9, |
| ZnO | 0 | to | 7.3, |
| PbO | 0 | to | 17.5, |
| BaO + PbO | 7.0 | to | 17.8, |
| $Fe_3O_4$ | 3.3 | to | 5.0, |
| $F_2$ | 0 | to | 0.7, |
| $Sb_2O_3$ | 0.05 | to | 0.1, |
| Sugar | 0.05 | to | 0.1. |

2. A glass according to claim 1, which is substantially lead oxide and fluorine-free and in which the percentages by weight of the following constituents of the melt are as follows:

| | | | |
|---|---|---|---|
| $Na_2O$ | 8.0 | to | 15.0, |
| $Li_2O + Na_2O$ | 11.0 | to | 14.1, |
| $Li_2O + Na_2O + K_2O$ | 15.0 | to | 19.7, |
| BaO | 7.0 | to | 12.9, |
| ZnO | 0 | to | 6.5, |
| BaO + ZnO | 13.5 | to | 17.0. |

3. A glass according to claim 1, in particular for use in conjunction with a magnetic alloy containing 48.5% Fe/48.5% Co/3% V, said glass being produced from a melt having substantially the following percentage composition by weight:

| | |
|---|---|
| $SiO_2$ | 56.5, |
| $B_2O_3$ | 7.2, |
| $Al_2O_3$ | 4.0, |
| $Li_2O$ | 2.0, |
| $Na_2O$ | 9.0, |
| PbO | 12.8, |
| BaO | 5.0, |
| $Fe_3O_4$ | 3.5, |
| $Sb_2O_3$ | 0.1, |
| Sugar | 0.05. |

4. A glass according to claim 2, in particular for use in conjunction with a magnetic alloy containing 48.5% Fe/48.5% Co/3% V, said glass being produced from a melt having substantially the following percentage composition by weight:

| | |
|---|---|
| $SiO_2$ | 56.0, |
| $B_2O_3$ | 8.0, |
| $Al_2O_3$ | 4.0, |
| $Li_2O$ | 3.0, |
| $Na_2O$ | 8.0, |
| BaO | 12.2, |
| ZnO | 4.8, |
| $Fe_3O_4$ | 4.0, |
| $Sb_2O_3$ | 0.1, |
| Sugar | 0.05. |

5. A glass according to claim 1, in particular for use in conjunction with a magnetic alloy containing 29.2% Fe/55.0% Co/11.8% Ni/1% Al/3% Ti, said glass being produced from a melt having substantially the following percentage composition by weight:

| | |
|---|---|
| $SiO_2$ | 58.0, |
| $B_2O_3$ | 6.7, |
| $Al_2O_3$ | 5.0, |
| $Li_2O$ | 2.0, |
| $Na_2O$ | 12.1, |
| PbO | 7.1, |
| BaO | 5.8, |
| $Fe_3O_4$ | 3.3, |
| $Sb_2O_3$ | 0.1, |
| Sugar | 0.05. |

6. A glass according to claim 2, in particular for use in conjunction with a magnetic alloy containing 29.2% Fe/55.0% Co/11.8% Ni/1% Al/3% Ti, said glass being produced from a melt having substantially the following percentage composition by weight:

| | |
|---|---|
| $SiO_2$ | 58.0, |
| $B_2O_3$ | 6.7, |
| $Al_2O_3$ | 5.0, |
| $Li_2O$ | 3.0, |
| $Na_2O$ | 11.1, |
| BaO | 12.9, |
| $Fe_3O_4$ | 3.3, |
| $Sb_2O_3$ | 0.1, |
| Sugar | 0.05. |

7. A glass according to claim 2, in particular for use in conjunction with a magnetic alloy containing 12% Fe/3% Nb/up to 0.3% Ta/approx. 85% Co, said glass being produced from a melt having substantially the following percentage composition by weight:

| | |
|---|---|
| $SiO_2$ | 57.6, |
| $B_2O_3$ | 3.5, |
| $Al_2O_3$ | 5.3, |
| $Li_2O$ | 1.5, |
| $Na_2O$ | 15.0, |
| $K_2O$ | 3.2, |
| BaO | 10.0, |
| $Fe_3O_4$ | 3.8, |
| $Sb_2O_3$ | 0.1, |
| Sugar | 0.05. |

8. In a reed switch comprising a magnetic alloy bonded to glass, the improvement comprising employing the glass of claim 1.

9. In a residual switch comprising a magnetic alloy bonded to glass, the improvement comprising employing the glass of claim 3.

10. In a residual switch comprising a magnetic alloy bonded to glass, the improvement comprising employing the glass of claim 4.

11. In a residual switch comprising a magnetic alloy bonded to glass, the improvement comprising employing the glass of claim 5.

12. In a residual switch comprising a magnetic alloy bonded to glass, the improvement comprising employing the glass of claim 6.

13. In a residual switch comprising a magnetic alloy bonded to glass, the improvement comprising employing the class of claim 7.

14. A glass according to claim 1, said glass being produced from a melt having a composition expressed in percentages by weight as follows:

| | | | |
|---|---|---|---|
| $SiO_2$ | 56 | to | 60.4 |
| $B_2O_3$ | 1.5 | to | 7.0 |
| $Al_2O_3$ | 4.0 | to | 5.3 |
| $Li_2O$ | 1.7 | to | 2.5 |
| $Na_2O$ | 9.5 | to | 15.0 |
| $K_2O$ | 0 | to | 1.5 |
| $Li_2O + Na_2O$ | 11.2 | to | 17.3 |
| $Li_2O + Na_2O + K_2O$ | 12.0 | to | 19.0 |
| CaO | 0 | | |
| BaO | 4.5 | to | 12.9 |
| ZnO | 0 | | |
| PbO | 0 | to | 12.0 |
| BaO + PbO | 11.3 | to | 16.8 |
| $Fe_3O_4$ | 3.5 | to | 4.0 |
| $F_2$ | 0 | | |
| $Sb_2O_3$ | 0.05 | to | 0.1 |
| Sugar | 0.05 | to | 0.1 |

15. In a residual switch comprising a magnetic alloy bonded to glass, the improvement comprising employing the glass of claim 14.

* * * * *